United States Patent
Koide

(10) Patent No.: US 9,397,956 B2
(45) Date of Patent: Jul. 19, 2016

(54) COMMUNICATION SYSTEM, CONTROL DEVICE, FORWARDING NODE, AND CONTROL METHOD AND PROGRAM FOR COMMUNICATION SYSTEM

(75) Inventor: Toshio Koide, Tokyo (JP)

(73) Assignee: NEC CORPORATION, Tokyo (JP)

( * ) Notice: Subject to any disclaimer, the term of this patent is extended or adjusted under 35 U.S.C. 154(b) by 116 days.

(21) Appl. No.: 14/123,388

(22) PCT Filed: Jun. 1, 2012

(86) PCT No.: PCT/JP2012/003629
§ 371 (c)(1),
(2), (4) Date: Dec. 2, 2013

(87) PCT Pub. No.: WO2012/164958
PCT Pub. Date: Dec. 6, 2012

(65) Prior Publication Data
US 2014/0307742 A1     Oct. 16, 2014

(30) Foreign Application Priority Data
Jun. 2, 2011     (JP) ................................ 2011-124263

(51) Int. Cl.
*H04L 12/933*     (2013.01)
*H04L 12/46*     (2006.01)

(52) U.S. Cl.
CPC ............ *H04L 49/15* (2013.01); *H04L 12/4633* (2013.01)

(58) Field of Classification Search
None
See application file for complete search history.

(56) References Cited

U.S. PATENT DOCUMENTS

| | | | | |
|---|---|---|---|---|
| 8,873,398 B2* | 10/2014 | Kempf et al. | .................. | 370/236 |
| 2006/0050719 A1* | 3/2006 | Barr et al. | ..................... | 370/401 |
| 2007/0073787 A1 | 3/2007 | Tysowski et al. | | |
| 2008/0189769 A1 | 8/2008 | Casado et al. | | |
| 2009/0141729 A1* | 6/2009 | Fan | ................................ | 370/401 |
| 2011/0261723 A1* | 10/2011 | Yamato et al. | ................ | 370/255 |
| 2011/0261825 A1 | 10/2011 | Ichino et al. | | |

(Continued)

FOREIGN PATENT DOCUMENTS

| | | |
|---|---|---|
| JP | 2009-510566 A | 3/2009 |
| WO | WO 2008/095010 A1 | 8/2008 |
| WO | WO 2010/103909 A1 | 9/2010 |

OTHER PUBLICATIONS

International Search Report dated Jun. 26, 2012 in International Patent Application Publication No. PCT/JP2012/003629.

(Continued)

*Primary Examiner* — Min Jung
(74) *Attorney, Agent, or Firm* — McGinn IP Law Group

(57) ABSTRACT

A communication system includes a plurality of forwarding nodes that process a received packet in accordance with a processing rule that determines a matching rule matching a packet and a process to be applied to a packet conforming with the matching rule; and a control apparatus that controls the forwarding nodes using control information. The control apparatus includes a tunnel establishing unit that determines forwarding path(s) for the respective control information for each of the forwarding nodes, and transmits to the forwarding nodes a tunnel establishing message including a processing rule for forwarding the control information to be set in the forwarding nodes in each of the forwarding paths. The respective forwarding nodes give and receive control information with regard to the control apparatus, by holding processing rules for forwarding the control information included in the tunnel establishing message.

20 Claims, 12 Drawing Sheets

(56) References Cited

U.S. PATENT DOCUMENTS

2011/0286324 A1* 11/2011 Bellagamba et al. ......... 370/219
2013/0058331 A1* 3/2013 Thakkar et al. ............... 370/389
2013/0058357 A1* 3/2013 Koponen et al. .............. 370/412

OTHER PUBLICATIONS

Nick McKeown, and 7 others, "OpenFlow: Enabling Innovation in Campus Networks", [online] [search conducted May 26, 2011] Internet URL: <URL: http://www.openflow.org/documents/openflow-wp-latest.pdf>.
"OpenFlow Switch Specification" Version 1.0.0. (Wire Protocol 0x01), [online] [search conducted May 26, 2011] Internet URL: <URL:http://www.openflow.org/documents/openflow-spec-v1.0.0.pdf>.
Koide, Toshio, and Shimonishi, Hideyuki: "A study on the automatic construction mechanism of control network in OpenFlow-based network", IEICE Technical Report, The Institute of Electronics, Information and Communication Engineers, NS2009-165 (Mar. 2010), vol. 109, No. 448, pp. 19-24, Mar. 2010.
Yuta Ashida, "A communication load reduction method on Source Flow based large-scale OpenFlow Networks", IEICE Technical Report, Feb. 24, 2011, vol. 110, No. 448, p. 341-346.
Japanese Office Action (Notice of Grounds for Rejection) dated Apr. 19, 2016 with partial English translation.

* cited by examiner

FIG.4

| TUNNEL ESTABLISHED SECTION | PORT SERIES LISTING |
|---|---|
| CONTROL DEVICE 10 → FORWARDING NODE 20a | CONTROL DEVICE 10 #1 |
| CONTROL DEVICE 10 ← FORWARDING NODE 20a | FORWARDING NODE 20a #1 |
| CONTROL DEVICE 10 → FORWARDING NODE 20b | CONTROL DEVICE 10 #1, FORWARDING NODE 20a #2 |
| CONTROL DEVICE 10 ← FORWARDING NODE 20b | FORWARDING NODE 20b #1, FORWARDING NODE 20a #1 |

FIG. 8

| TUNNEL ESTABLISHED SECTION | PROCESSING RULE TO BE SET IN FORWARDING NODE 20a | PROCESSING RULE TO BE SET IN FORWARDING NODE 20b |
|---|---|---|
| CONTROL DEVICE 10 → FORWARDING NODE 20a | A CONTROL PACKET WITH THE FORWARDING NODE 20a AS A DESTINATION, INPUTTED AT PORT #1, IS CONVERTED TO A CONTROL MESSAGE AND THEN OUTPUTTED TO THE TUNNELING UNIT 23 | NONE |
| CONTROL DEVICE 10 ← FORWARDING NODE 20a | A CONTROL MESSAGE WITH THE CONTROL DEVICE 10 AS A DESTINATION, INPUTTED FROM THE TUNNELING UNIT 23, IS CONVERTED TO A CONTROL PACKET AND THEN OUTPUTTED FROM PORT #1 | NONE |
| CONTROL DEVICE 10 → FORWARDING NODE 20b | A CONTROL PACKET WITH THE FORWARDING NODE 20b AS A DESTINATION, INPUTTED AT PORT #1, IS OUTPUTTED FROM PORT #2 | A CONTROL PACKET WITH THE FORWARDING NODE 20b AS A DESTINATION, INPUTTED AT PORT #1, IS CONVERTED TO A CONTROL MESSAGE AND THEN OUTPUTTED TO THE TUNNELING UNIT 23 |
| CONTROL DEVICE 10 ← FORWARDING NODE 20b | A CONTROL PACKET WITH THE CONTROL DEVICE 10 AS A DESTINATION, INPUTTED AT PORT #2, IS OUTPUTTED FROM PORT #1 | A CONTROL MESSAGE WITH THE CONTROL DEVICE 10 AS A DESTINATION, INPUTTED FROM THE TUNNELING UNIT 23, IS CONVERTED TO A CONTROL PACKET AND THEN OUTPUTTED FROM PORT #1 |

COMMUNICATION SYSTEM, CONTROL DEVICE, FORWARDING NODE, AND CONTROL METHOD AND PROGRAM FOR COMMUNICATION SYSTEM

TECHNICAL FIELD

REFERENCE TO RELATED APPLICATION

This application is based upon and claims the benefit of the priority of Japanese patent application No. 2011-124263, filed on Jun. 2, 2011, the disclosure of which is incorporated herein in its entirety by reference thereto.

This invention relates to a communication system, a control device, a forwarding node, and a control method and computer program for the communication system, and in particular to a communication system for controlling a forwarding node disposed in a network, a control device, a forwarding node, and a control method and computer program for the communication system.

BACKGROUND

As a communication system in which a control device centrally controls forwarding nodes, technology referred to as OpenFlow is known (refer to PTL 1, and NPLs 1 and 2). In OpenFlow, communication is treated as end-to-end flow, and path control, recovery from failure, load balancing and optimization are performed in flow units. An OpenFlow switch as specified in NPL 2 is provided with a secure channel for communication with an OpenFlow controller positioned as a control device, and operates according to a flow table in which appropriate addition or rewriting is instructed by the OpenFlow controller. In the flow table are definitions of sets of matching rules (Header fields) for collation with packet headers, flow statistical information (Counters), and actions (Actions) defining processing content, for each flow (refer to FIG. 12).

For example, when an OpenFlow switch receives a packet, an entry is searched for that has a matching rule (refer to header fields in FIG. 12) that matches header information of the received packet, from the flow table. As a result of the search, in a case where an entry matching the received packet is found, the OpenFlow switch updates the flow statistical information (Counters) and also implements processing content (packet transmission from a specified port, flooding, dropping, and the like) described in an Actions field of the entry in question, for the received packet. On the other hand, as a result of the search, in a case where an entry matching the received packet is not found, the OpenFlow switch forwards the received packet to the OpenFlow controller via a secure channel, requests determination of a path of the packet based on source and destination of the received packet, receives a flow entry realizing this, and updates the flow table. In this way, the OpenFlow switch uses the entry stored in the flow table as a processing rule to perform packet forwarding.

NPL 3 proposes constructing a secure channel for the abovementioned type of OpenFlow network in a real network using special frames and source-routing (below, a control channel constructed in this real network is referred to as an "in-band secure channel").

CITATION LIST

Patent Literature (PTL)

[NPL 1]
PCT International Publication No. WO2008/095010
[PLT 2]
Japanese Patent Kohyo Publication No.JP2009-510566A

Non Patent Literature (NPL)

Patent Literature

[NPL 1]
Nick McKeown, and 7 others, "OpenFlow: Enabling Innovation in Campus Networks", [online] [search conducted May 26, 2011] Internet URL: <URL: http://www.openflow.org/documents/openflow-wp-latest.pdf>
[NPL 2]
"OpenFlow Switch Specification" Version 1.0.0. (Wire Protocol 0x01), [online] [search conducted May 26, 2011] Internet URL: <URL:http://www.openflow.org/documents/openflow-spec-v1.0.0.pdf>
[NPL 3]
Koide, Toshio, and Shimonishi, Hideyuki: "A study on the automatic construction mechanism of control network in OpenFlow-based network", IEICE Technical Report, The Institute of Electronics, Information and Communication Engineers, NS2009-165 (2010-03), Vol. 109, No. 448, pp. 19-24, March 2010.

SUMMARY

The entire disclosures of the abovementioned PTLs 1 and 2 and NPLs 1, 2 and 3 are incorporated herein by reference thereto. The following analysis is given according to the present invention. From now on, by using a technique as in the abovementioned NPL 3, it will be possible to construct a network based on the abovementioned OpenFlow for homes and businesses, using an in-band secure channel, without preparing a control dedicated network.

The abovementioned in-band secure channel is established between a control device that functions as an OpenFlow controller, and a forwarding node that functions as an OpenFlow switch. NPL 3 proposes constructing the abovementioned in-band secure channel using source-routing.

However, due to a reliance on software processing in a forwarding node in a system of NPL 3 which uses the source-routing, and particularly in a case where there is a large number of forwarding nodes and the in-band secure channel is established via plural forwarding nodes, there is a problem in that forwarding load on route-side forwarding nodes tends to increase. As a result, in comparison with a configuration that does not use an in-band secure channel in which all forwarding nodes and a control device are directly connected, there is a possibility of an increase in delays in transmitting and receiving control information and of a deterioration in performance of the overall network.

It is an object thereof to provide a communication system, a control device, a forwarding node, and a control method and computer program in which the forwarding load with regard to control information can be reduced in a case of constructing a centrally controlled network, as represented by OpenFlow, using the abovementioned in-band secure channel.

According to a first aspect, there is provided a communication system comprising: a plurality of forwarding nodes that process a received packet in accordance with a processing rule that determines a matching rule matching a packet and a process to be applied to a packet conforming with the matching rule; and a control device that controls the forwarding nodes using control information. The control device comprises a tunnel establishing unit that determines a forwarding path(s) of the respective control information concerning each of the forwarding nodes, and transmits to the forwarding nodes a tunnel establishing message including a processing rule for forwarding the control information to be set in the forwarding nodes in each of the forwarding path(s), and the respective forwarding nodes give and receive control information with regard to the control device, by holding processing rules for forwarding the control information included in the tunnel establishing message.

According to a second aspect, there is provided a control apparatus adapted to be connected to a plurality of forwarding nodes that process a received packet in accordance with a processing rule that determines a matching rule matching a packet and a process to be applied to a packet conforming with the matching rule. The control device comprises: a tunnel establishing unit that determines a forwarding path(s) of respective control information concerning each of the forwarding nodes, and transmits to the forwarding nodes a tunnel establishing message including a processing rule for forwarding the control information to be set in the forwarding nodes in the respective forwarding path(s).

According to a third aspect, there is provided a communication method for a communication system comprising a plurality of forwarding nodes that process a received packet in accordance with a processing rule which determines a matching rule matching a packet and a process to be applied to a packet conforming with the matching rule, and a control device that controls the forwarding nodes using control information. The method comprises: a step in which the control device determines a forwarding path(s) of the respective control information concerning each of the forwarding nodes, and transmits to the forwarding node(s) a tunnel establishing message including a processing rule for forwarding the control information to be set in forwarding node(s) in the respective forwarding path(s); and a step in which the respective forwarding node(s) give and receive control information with regard to the control device, by holding processing rules for forwarding the control information included in the tunnel establishing message. The present method is linked with a specific apparatus, known as a communication system that includes the control device and the forwarding nodes.

According to a fourth aspect, there is provided a computer program that executes in a computer included in a communication system comprising: a plurality of forwarding nodes that process a received packet in accordance with a processing rule that determines a matching rule matching a packet and a process to be applied to a packet conforming with the matching rule, and a control device that controls the forwarding nodes using control information. The program executes: a process of determining a forwarding path(s) of the respective control information concerning each of the forwarding nodes, and a process of transmitting to the forwarding nodes a tunnel establishing message including a processing rule for forwarding the control information to be set in the forwarding nodes in the respective forwarding paths. It is to be noted that that this program can be recorded on a computer-readable, non-transient storage medium. That is, the present invention can be embodied as a computer program product.

The meritorious effects of the present invention are summarized as follows.

According to the present invention, it is possible to reduce the forwarding load with regard to control information in a case of constructing a centrally controlled network as represented by OpenFlow, using the abovementioned in-band secure channel.

BRIEF DESCRIPTION OF DRAWINGS

FIG. 4 is an example of correspondence relationships of port series listings and tunnel established sections as set by the control device of a first exemplary embodiment of the invention;

FIG. 8 is an example of a processing rule set in the respective forwarding nodes in order to realize the tunnel established sections of the first exemplary embodiment of the invention;

PREFERRED MODES

First a description is given of an outline of an exemplary embodiment of the present invention, making reference to the drawings. It is to be noted that drawing reference symbols included in this outline are added for convenience to respective elements as an example in order to aid understanding, and are not intended to limit the invention to modes of the drawings shown.

Figure 1:
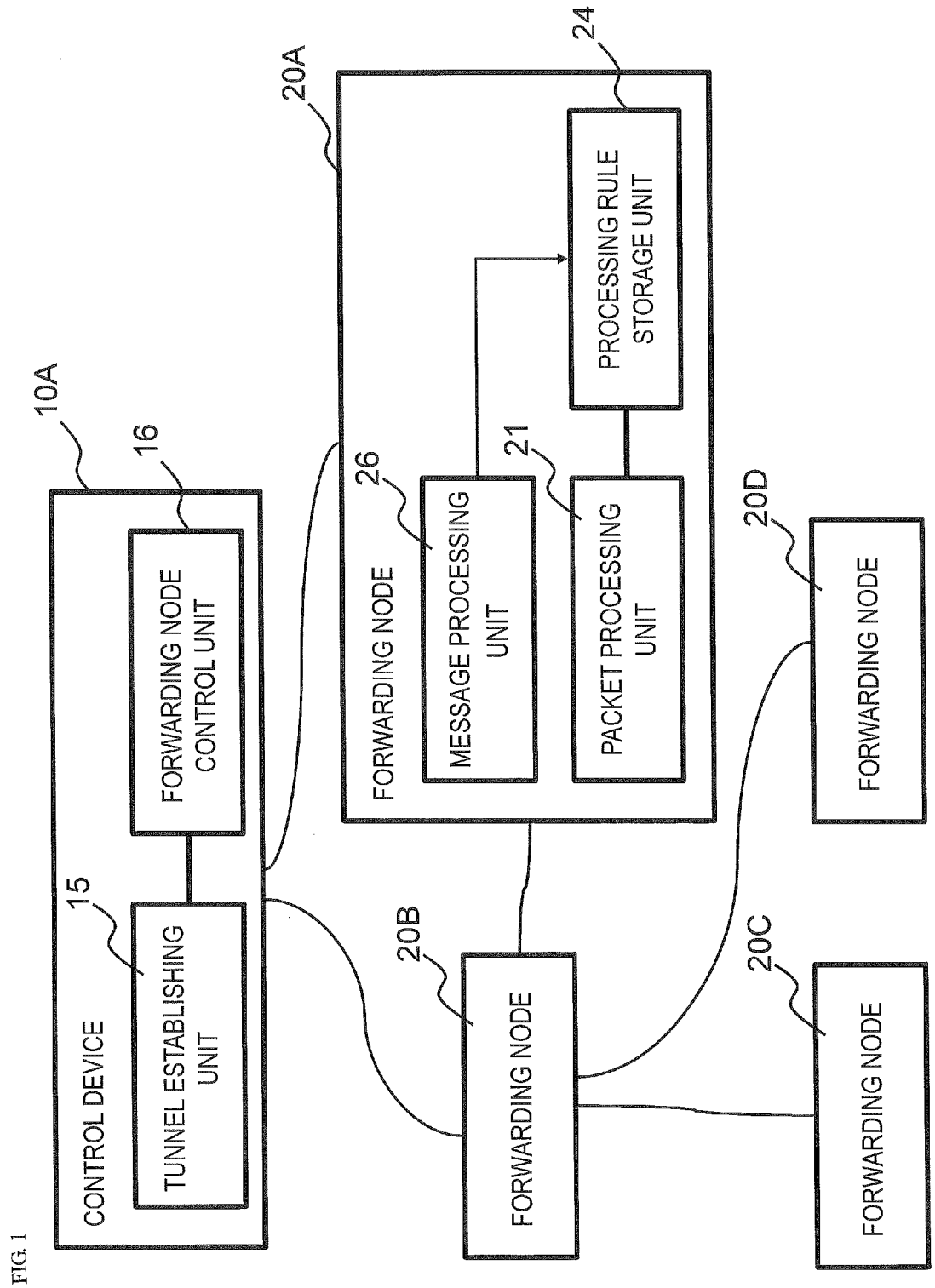
FIG. 1 is a diagram for describing an outline of an exemplary embodiment of the present invention.

As shown in FIG. 1, the exemplary embodiment of the present invention can be realized in a configuration including a plurality of forwarding nodes 20A to 20D, and a control device 10A that controls these forwarding nodes. It is to be noted that FIG. 1 shows an example of a case where a communication system is provided with four forwarding nodes 20A to 20D, but there is no particular limitation to the number of forwarding nodes nor to connection relationships of the forwarding nodes. In addition, FIG. 1 shows an example in which two forwarding nodes 20A and 20B are connected to the control device 10A, but the number of forwarding nodes connected to the control device 10A may be one, or may be three or more. It is sufficient if at least one forwarding node is connected to the control device 10A.

The control device 10A has a configuration provided with a forwarding node control unit 16 that controls the forwarding nodes using control information, and a tunnel establishing unit 15 that determines forwarding paths for the respective control information for each of the forwarding nodes, and transmits to the forwarding nodes a tunnel establishing message including a processing rule for forwarding the control information to be set in the forwarding nodes in each of the forwarding paths.

By using a technique as in the abovementioned NPL 3, the tunnel establishing unit 15 transmits to each of the forwarding nodes a tunnel establishing message including comprehension of the presence of, and connection relationships of, the forwarding nodes 20A to 20D, calculation of the forwarding paths of control information between the control device 10A and each of the forwarding nodes, and processing rules for forwarding the control information that realizes the forwarding path(s). In the processing rule for forwarding the control information, a matching rule to enable control information from the forwarding node control unit 16 directed to the respective forwarding nodes 20A to 20D to be uniquely identified, and processing for forwarding the control information to a destination forwarding node, among the forwarding nodes 20A to 20D, are set.

Each of the forwarding nodes 20A to 20D is respectively configured to be provided with a processing rule storage unit 24 that stores a processing rule determining a matching rule matching a packet and a process to be applied to a packet conforming with the matching rule, a packet processing unit 21 that processes a received packet in accordance with the processing rule, and a message processing unit 26 that extracts a processing rule for forwarding the control information included in a tunnel establishing message transmitted from the control device 10A, to be stored in the processing rule storage unit 24.

Figure 2:
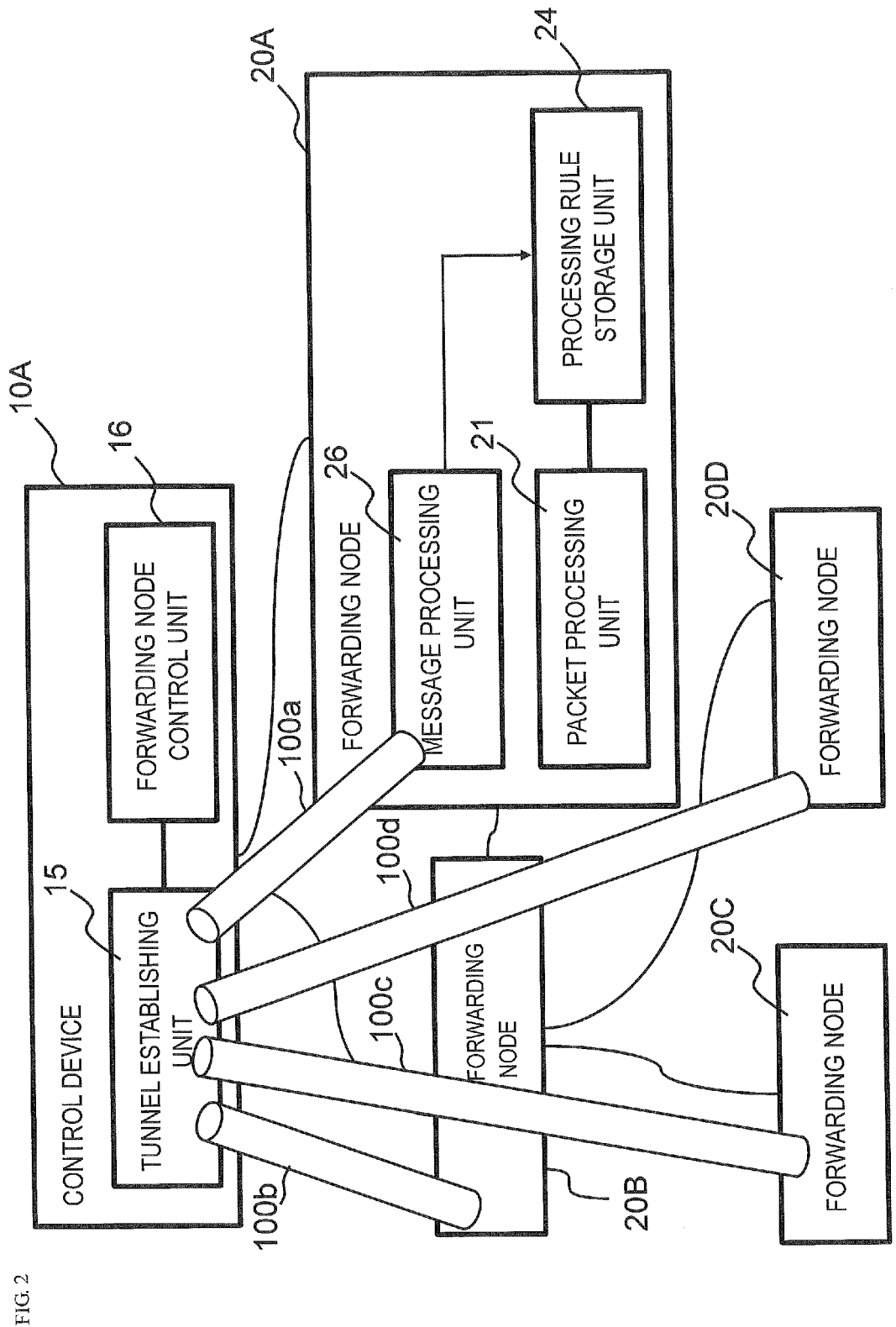
FIG. 2 is a diagram showing a state in which tunnels are established between a control device and respective forwarding nodes of FIG. 1.

When setting of the processing rule for transferring the control information to the processing rule storage unit 24 of the respective forwarding nodes 20A to 20D by the tunnel establishing unit 15 is complete, independent tunnels 100a to 100d are established between the control device 10A and the forwarding nodes 20A to 20D respectively, as shown in FIG. 2.

Thereafter, when the forwarding node control unit 16 transmits a packet including the control information to a destination forwarding node, among the forwarding nodes 20A to 20D, the control information is forwarded to a target forwarding node, in accordance with a processing rule for forwarding control information set in the respective forwarding nodes 20A to 20D. After that, in accordance with the control information, in response to a request from a forwarding node, a processing rule for forwarding a general data packet is set in the respective forwarding nodes.

As described above, according to the exemplary embodiment of the present invention, as in NPL 3, transmission of control information using source-routing occurs up to tunnel establishment, and thereafter control information is given and received according to a processing rule as in an OpenFlow switch of NPLs 1 and 2. Accordingly, even in a case where the number of forwarding nodes is large, it is possible to reduce the forwarding load with regard to control information in a forwarding node in a forwarding path of the control information.

It is to be noted that regarding a mode which includes a processing rule for forwarding the control information in the tunnel establishing message, it is possible to use various modes in addition to a mode of transmitting the tunnel establishing message including a processing rule for forwarding the control information with respect to the respective forwarding nodes. For example, consideration may be given to a mode in which a processing rule to be set in a plurality of forwarding nodes is stored in one tunnel establishing message. In this case, in order that each of the forwarding nodes can identify a processing rule to be set in its own device, it is possible to arrange to include forwarding node identification information, hop count from the control device 10A, and the like. Furthermore, consideration may be given to a mode in which processing rules are arranged in path order in a forwarding path and stored, and a forwarding node deletes or disables a processing rule set in its own device in sequence. A flag for identifying a forwarding node that is a target for setting of a processing rule in the forwarding path may be set in the tunnel establishing message, or a flag indicating that a forwarding node at an extremity of the forwarding path is the target for setting of a processing rule, may be set.

(First Exemplary Embodiment)

Next, a detailed description is given concerning a first exemplary embodiment of the present invention, making reference to the drawings.

Figure 3:
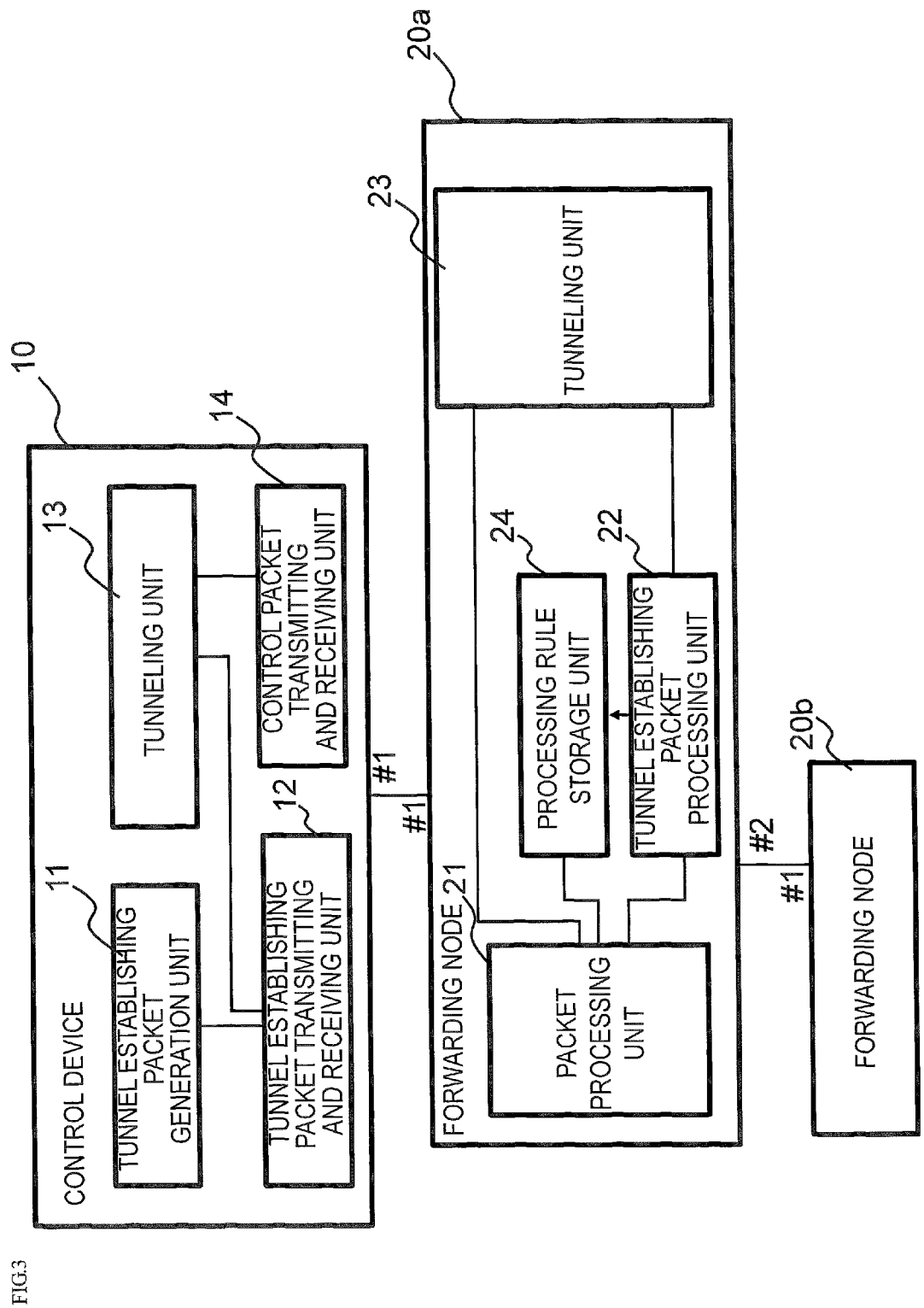
FIG. 3 is a diagram showing a configuration of a communication system according to a first exemplary embodiment of the invention.

FIG. 3 is a diagram showing a configuration of a communication system according to the first exemplary embodiment of the invention. Referring to FIG. 3, a configuration including a control device 10 and two forwarding nodes 20a and 20b is shown. The symbols #1 and #2, which are appended between the control device 10 and the forwarding nodes 20a and 20b, represent port numbers.

An output port #1 of the control device 10 is connected to the forwarding node 20a at input port #1 . The forwarding node 20a is connected to the control device 10 via an output port #1 , and is connected to the forwarding node 20b via an output port #2 thereof. Moreover, the forwarding node 20b is connected to the forwarding node 20a via an output port #2 thereof.

The control device 10 has a configuration provided with a tunnel establishing packet generation unit 11, a tunnel establishing packet transmitting and receiving unit 12, a tunneling unit 13, and a control packet transmitting and receiving unit 14.

The tunnel establishing packet generation unit 11 generates a tunnel establishing packet and controls transmission and reception thereof. Specifically, by using a technique as in NPL 3 or the like, the tunnel establishing packet generation unit 11 interacts with a forwarding node using a tunnel establishing packet, comprehends the presence of and connection relationships of forwarding nodes 20a to 20d, calculates a forwarding path for forwarding control information to form a tunnel between the control device 10 and respective forwarding nodes, and finally generates a tunnel establishing packet including a processing rule realizing the forwarding path in question. Below, in the present exemplary embodiment, a packet, which is given or received using the technique of NPL 3 or the like, using source-routing, among packets that give or receive control information between the control device 10 and the respective forwarding nodes, is called a "tunnel establishing packet", and a packet given or received by a processing rule set in each of the forwarding nodes is called a "control packet".

FIG. 4 is an example of tunnel established sections between the control device 10 and respective forwarding nodes in a case where the forwarding node 20a and the forwarding node 20b are connected in series, with regard to the control device 10, as in FIG. 3, and a port series listing calculated by the tunnel establishing packet generation unit 11 at this time. For example, a tunnel that transmits control information from the control device 10 to the forwarding node 20a is identified by port #1 of the control device 10. Furthermore, a tunnel that transmits control information from the control device 10 to the forwarding node 20b is identified by a port series listing of the port #1 of the control device 10 and port #2 of the forwarding node 20a. That is, the port series listing is identified by listing, e.g., output port concerned of any unit item (control device and forwarding node etc.).

The tunnel establishing packet transmitting and receiving unit 12 performs transmission and reception of a tunnel establishing packet in accordance with an instruction of the tunnel establishing packet generation unit 11.

Below, in the present exemplary embodiment, with an EtherType field value of 0x1F03, a destination MAC address as a broadcast address, and path information in a data area, the tunnel establishing packet indicates an output port series listing and the number of hops from a start point, and includes a hop count updated by each of the forwarding nodes. However, the configuration of the tunnel establishing packet is merely an example and can be distinguished from a packet transmitted or received in a data plane; as long as the information necessary for source-routing is included, there is no limitation to its format.

The tunneling unit 13 performs tunneling of control information given or received between the control device 10 and the respective forwarding nodes 20a to 20d. Specifically, the tunneling unit 13 performs a process of specifying a destination forwarding node and outputting a packet including control information (a tunnel establishing packet or a control packet), with respect to a tunnel establishing packet transmitting and receiving unit 12 or a control packet transmitting and receiving unit 14, and a process of receiving a packet including control information via the tunnel establishing packet transmitting and receiving unit 12 or the control packet transmitting and receiving unit 14.

In the present exemplary embodiment, a description is given where the tunneling unit 13 takes on the role of a virtual device that can transmit and receive control information as an IPv4 or IPv6 packet, and specification of a forwarding node is performed according to a destination IP address, but the packet format and method of specifying the forwarding node is not limited to these.

The control packet transmitting and receiving unit 14 transmits/receives a control packet including control information including an identifier of the control device 10 or a forwarding node. It is to be noted that at this time, the control packet transmitting and receiving unit 14 may perform interconversion of a packet received from the tunneling unit 13, with a packet of a format that can be processed making reference to a processing rule stored in a processing rule storage unit 24 by a packet processing unit 21 of the forwarding node. Below, in the present exemplary embodiment, the control packet is a packet with a destination MAC address as the MAC address of the control device 10 or forwarding node, and an EtherType field value of 0x1F03. However, the control packet configuration is merely an example, and as long as it is possible to distinguish between a tunnel establishing packet and a packet transmitted or received in a data plane, there is no limitation to its format.

It is to be noted that part of the abovementioned tunnel establishing packet generation unit 11, the tunnel establishment packet transmitting and receiving unit 12, and the tunneling unit 13 correspond to the abovementioned tunnel establishing unit 15, and the abovementioned tunneling unit 13 and the control packet transmitting and receiving unit 14 correspond to the abovementioned forwarding node control unit 16.

The forwarding nodes 20a to 20d are configured to be provided with the packet processing unit 21, a tunnel establishing packet processing unit 22, a tunneling unit 23, and the processing rule storage unit 24.

The packet processing unit 21 performs processing on a received packet in accordance with a processing rule held in the processing rule storage unit 24. However, in a case where the received packet is a tunnel establishing packet, the received packet is outputted to the tunnel establishing packet processing unit 22. Specifically, similar to a specification disclosed in NPL 2, on receiving a packet, the packet processing unit 21 searches for a processing rule that corresponds to an entry having a matching rule that matches header information of the received packet, from the processing rule storage unit 24 that corresponds to a flow table. As a result of the search, in a case where a processing rule matching the received packet is found, the packet processing unit 21 implements processing content (packet transmission from a specified port, flooding, dropping, and the like) described in the processing rule in question, with regard to the received packet.

On the other hand, as a result of the search, in a case where a processing rule matching the received packet is not found, the packet processing unit 21 transmits the received packet to the control device 10, via the tunneling unit 23. However, in a case where the received packet is a tunnel establishing packet, the packet processing unit 21, is not bound by a processing rule held in the processing rule storage unit 24, and outputs the received packet (tunnel establishing packet) to the tunnel establishing packet processing unit 22. It is to be noted that the packet output to the tunnel establishing packet processing unit 22 in a case of receiving the received packet (tunnel establishing packet) can also be realized using a processing rule. For example, in a case where the tunnel establishing packet has an EtherType field value of 0x1F03, and a broadcast address is set as a destination MAC address, a processing rule of processing content outputting a packet that matches this type of matching rule to the tunnel establishing packet processing unit 22, may be set in the processing rule storage unit 24.

The tunnel establishing packet processing unit 22 performs processing of a tunnel establishing packet transmitted from the control device 10 described above, and also generates and transmits a tunnel establishing packet to the control device 10 as necessary. Specifically, the tunnel establishing packet processing unit 22 provides forwarding node information, holds a path to the control device, performs tunneling of control information using the tunnel establishing packet, and performs forwarding of a tunnel establishing packet by source-routing using path information (output port series listing and hop count) included in the tunnel establishing packet, as disclosed in NPL 3.

The tunneling unit (forwarding node side tunneling unit) 23 corresponds to a message processing unit 26 as described above, and performs tunneling of control information to be given or received with respect to the control device 10. Specifically, the tunneling unit 23 outputs control information that the forwarding node 20a is attempting to transmit to the control device 10, to the tunnel establishing packet processing unit 22 or the packet processing unit 21. Furthermore, the tunneling unit 23 receives control information to be processed by the forwarding node 20a sent from the control device 10, from the tunnel establishing packet processing unit 22 or the packet processing unit 21, and outputs to a control unit (not shown in the drawings) inside the forwarding node 20a.

In the present exemplary embodiment, a description is given where the tunneling unit 23 takes on the role of a virtual device that can transmit and receive control information as an IPv4 or IPv6 packet, and processing is performed only in a case of performing specification of the control device 10 according to a destination IP address, but the format of a packet handled by the tunneling unit 23, the method of specifying the control device, and processing in a case of specifying a device outside of the control device are not limited to this.

The processing rule storage unit 24 holds a processing rule for a packet received by the packet processing unit 21. Specifically, similar to the specification disclosed in NPL 2, it is possible to hold a plurality of sets (combinations) including a rule corresponding to a matching rule (Header field) that matches a packet header, and processing content corresponding to an action (Actions).

It is to be noted that in FIG. 3, the configuration of the forwarding node 20*b* is omitted, but the forwarding node 20*b* has a configuration similar to the forwarding node 20*a*.

Therefore, after the control device 10 establishes an in-band secure channel with the respective forwarding nodes using the technique of NPL 3 or the like, a processing rule matching the format of the control packet described above is set, for the processing rule storage unit 24 of the respective forwarding nodes, using the specification disclosed in NPL 2.

Viewed from a certain forwarding node, the abovementioned processing rule includes a processing rule for forwarding a data packet having another forwarding node as a destination and a packet including control information between another packet and the control device 10, and a processing rule for giving and receiving a packet including control information between the tunneling unit 23 of the forwarding node in question and the tunneling unit 13 of the control device 10. It is to be noted that in a case where the format of a packet including control information to be given or received with respect to the control device 10 and that of a packet that can be handled inside a forwarding node are different, a setting may be performed of a process to mutually convert each thereof, into the processing rule in question.

Furthermore, these processing rules are created to reflect a packet forwarding route between the control device 10 and the respective forwarding nodes calculated by the tunnel establishing packet generation unit 11 that prosecutes control. However, the forwarding path may be calculated in advance, or may be calculated using a separate arbitrary algorithm.

It is to be noted that respective parts (components or processing means) of the control device 10 and the forwarding node 20*a* shown in FIG. 3 can be realized by a computer program that executes the respective processes described above, in a computer configuring the control device 10 and the forwarding node 20*a*, using hardware thereof.

Next, a detailed description is given concerning operations of the first exemplary embodiment of the present invention, making reference to the drawings. In the following description, it is assumed that the control device 10 in an initial state does not comprehend the presence and connection relationships of the forwarding nodes 20*a* and 20*b*, and a control channel is not established.

Figure 5:
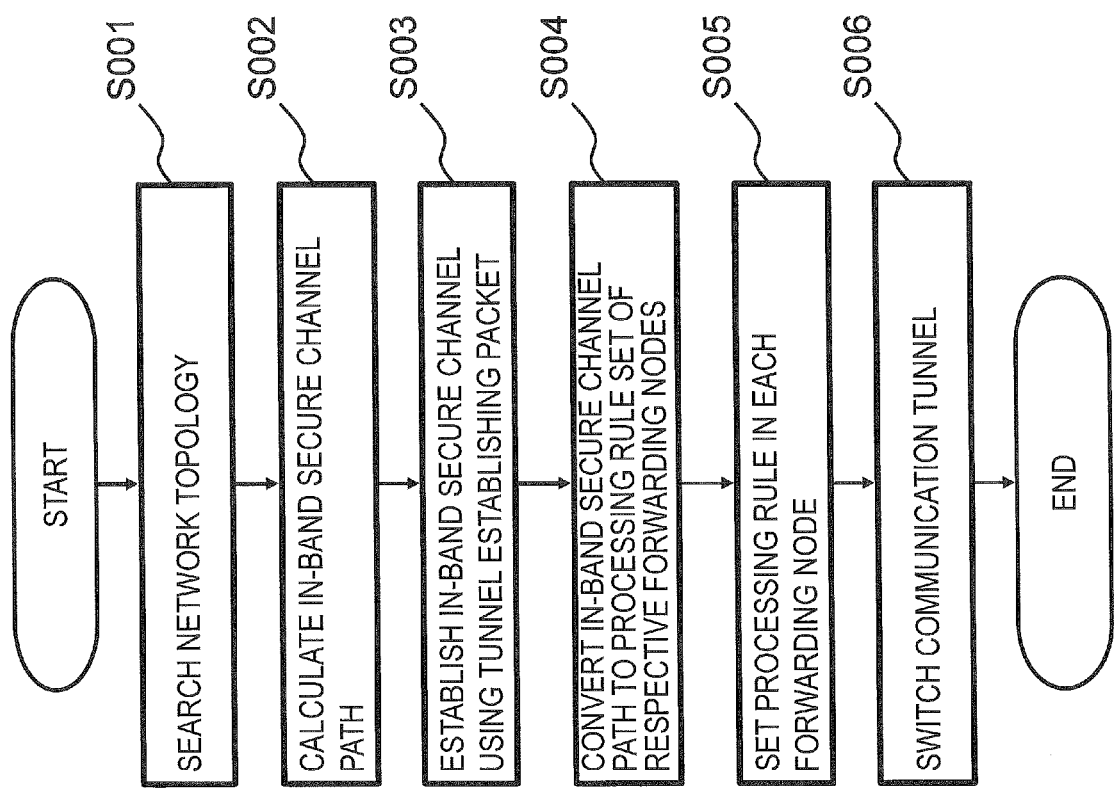
FIG. 5 is a flow diagram for describing operations of the control device of the first exemplary embodiment of the invention.
Figure 6:
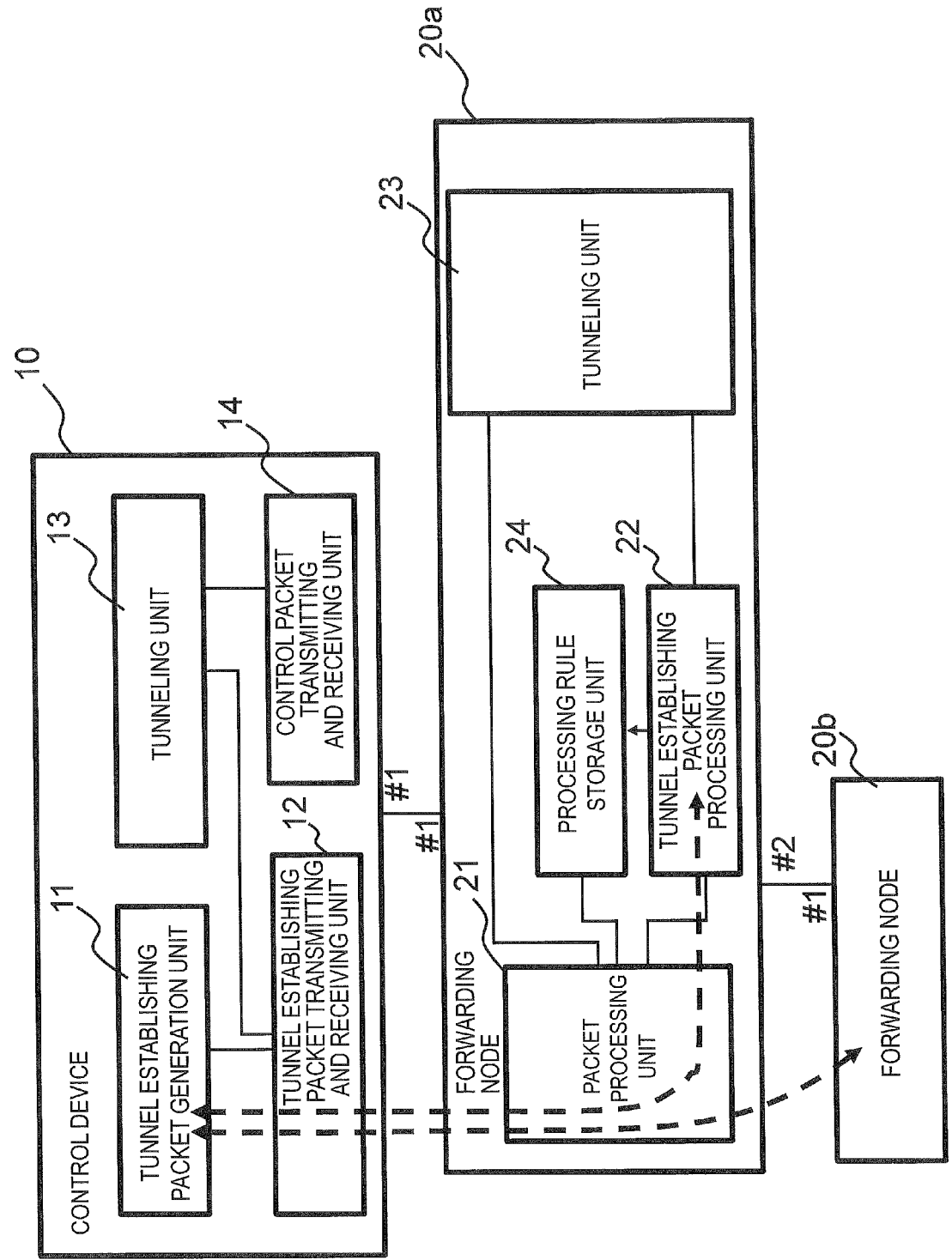
FIG. 6 is a reference diagram for describing flow of control information of the first exemplary embodiment of the invention.

FIG. 5 is a flow diagram for describing operations of the control device of the first exemplary embodiment of the invention. Referring to FIG. 5, the tunnel establishing packet generation unit 11 of the control device 10 transmits a tunnel establishing packet to the forwarding nodes 20*a* and 20*b* by a technique as in NPL 3 or the like, receives a tunnel establishing packet that includes a response thereto from the forwarding nodes 20*a* and 20*b*, and comprehends the presence and connection relationships of the forwarding nodes 20*a* and 20*b* (step S001). FIG. 6 is a diagram showing flow of control information given or received using the tunnel establishing packet of step S001.

For example, the tunnel establishing packet generation unit 11 sequentially interacts with the tunnel establishing packet processing unit 22 of the forwarding nodes 20*a* and 20*b*, to obtain a port series listing as shown in FIG. 4. The tunnel establishing packet between the control device 10 and the forwarding node 20*b* is transmitted by source-routing using the port series listing between the control device 10 and the forwarding node 20*b* of FIG. 4.

Next, the tunnel establishing packet generation unit 11 performs an operation to calculate a path between the control device 10 and the forwarding nodes 20*a* and 20*b* (step S002), and establishes an in-band secure channel using the tunnel establishing packet (step S003).

Specifically, [#1] is included as a port series listing in the tunnel establishing packet directed towards the forwarding node 20*a* from the control device 10. Furthermore, [#1] is included as a port series listing in the tunnel establishing packet directed towards the control device 10 from the forwarding node 20*a*. [#1, #2] is included as a port series listing in the tunnel establishing packet directed towards the forwarding node 20*b* from the control device 10. [#1, #1] is included as a port series listing in the tunnel establishing packet directed towards the control device 10 from the forwarding node 20*b*.

Figure 7:
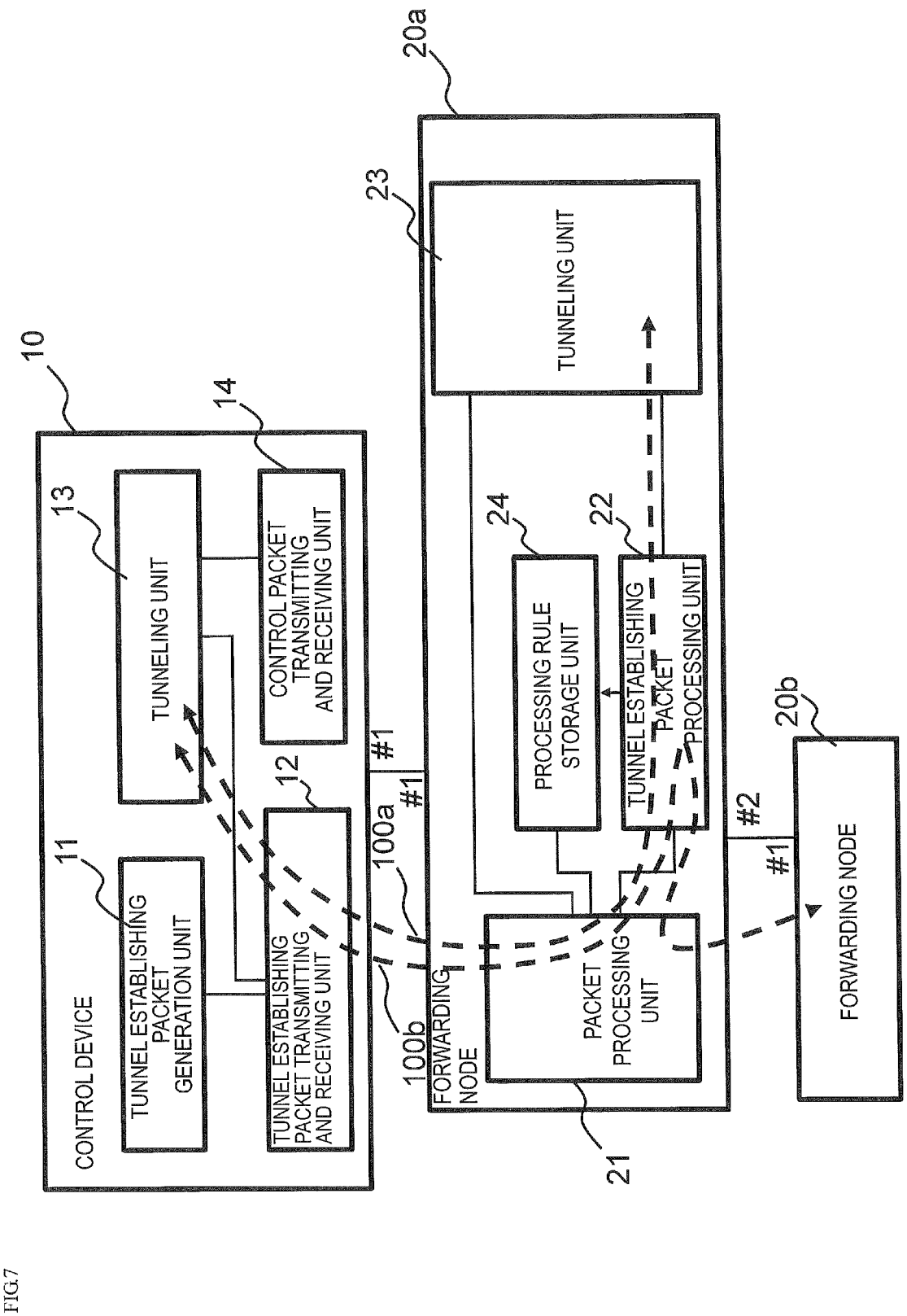
FIG. 7 is a reference diagram for describing flow of control information of the first exemplary embodiment of the invention.

FIG. 7 is a diagram showing flow of control information given or received by the tunnel establishing packet at the time of step S003. The tunneling part 13 of the control device 10 forms a communication tunnel 100*a* using the tunnel establishing packet with the tunneling unit 23 of the forwarding node 20*a*. An in-band secure channel for the control device 10 to control the forwarding node 20*a* is established in the communication tunnel 100*a*. It is to be noted that internal blocks of the forwarding node 20*b* are the same as the forwarding node 20*a* and are omitted in FIG. 7.

The communication tunnel 100*a* is configured via the tunneling unit 13 and the tunnel establishment packet transmitting and receiving unit 12 of the control device 10, a communication line between the control device 10 and the forwarding node 20*a*, and the packet processing unit 21, the tunnel establishing packet processing unit 22, and the tunneling unit 23 of the forwarding node 20*a*.

In the same way, the tunneling part 13 of the control device 10 forms a communication tunnel 100*b* using the tunnel establishing packet with a tunneling unit 23 (not shown in FIG. 7) of the forwarding node 20*b*. An in-band secure channel for the control device 10 to control the forwarding node 20*b* is established in the communication tunnel 100*b*.

The communication tunnel 100*b* is configured via the tunneling unit 13 of the control device 10, the tunnel establishment packet transmitting and receiving unit 12 of the control device 10, a communication line between the control device 10 and the forwarding node 20*a*, a packet processing unit 21 of the forwarding node 20*a*, a tunnel establishing packet processing unit 22 of the forwarding node 20*a*, a packet processing unit 21 of the forwarding node 20*a*, a communication line between the forwarding node 20*a* and the forwarding node 20*b*, a packet processing unit 21 (not shown in FIG. 7) of the forwarding node 20*b*, a tunnel establishing packet processing unit 22 (not shown in FIG. 7) of the forwarding node 20*b*, and a tunneling unit 23 (not shown in FIG. 7) of the forwarding node 20*b*.

Thereafter, the control device 10 converts a path of the in-band secure channel to a processing rule set (combination) of the respective forwarding nodes 20*a* and 20*b* (step S004), and sets respective processing rules in the respective forwarding nodes 20*a* and 20*b* using the in-band secure channel (step S005).

FIG. 8 is an example of a processing rule set (combination) in each of the forwarding nodes in order to realize tunnel established sections shown in FIG. 4. Referring to FIG. 8, a processing rule by which a control packet with the forwarding node 20a as a destination, inputted from port 1, is converted to a prescribed control message and then outputted to the tunneling unit 23, a processing rule by which a control message with the control device 10 as a destination, inputted from the tunneling unit 23, is converted to a control packet and then outputted from port 1, a processing rule by which a control packet with the forwarding node 20b as a destination, inputted at port 1, is outputted from port #2, and a processing rule by which a control packet with the control device 10 as a destination, inputted at port #2, is outputted from port 1, are set in the forwarding node 20a.

Furthermore, a processing rule by which a control packet with the forwarding node 20b as a destination, inputted at port 1, is converted to a prescribed control message and then outputted to the tunneling unit 23, and a processing rule by which a control message with the control device 10 as a destination, inputted at the tunneling unit 23, is converted to a control packet and then outputted from port 1, are set in the forwarding node 20b.

After setting the processing rules, the tunneling unit 13 of the control device 10 and the tunneling unit 23 of the forwarding nodes 20a and 20b are each switched so as to form a communication tunnel using a control packet instead of tunnel establishing packet. In this way, the in-band secure channel is established using a control packet (step S006).

Figure 9:
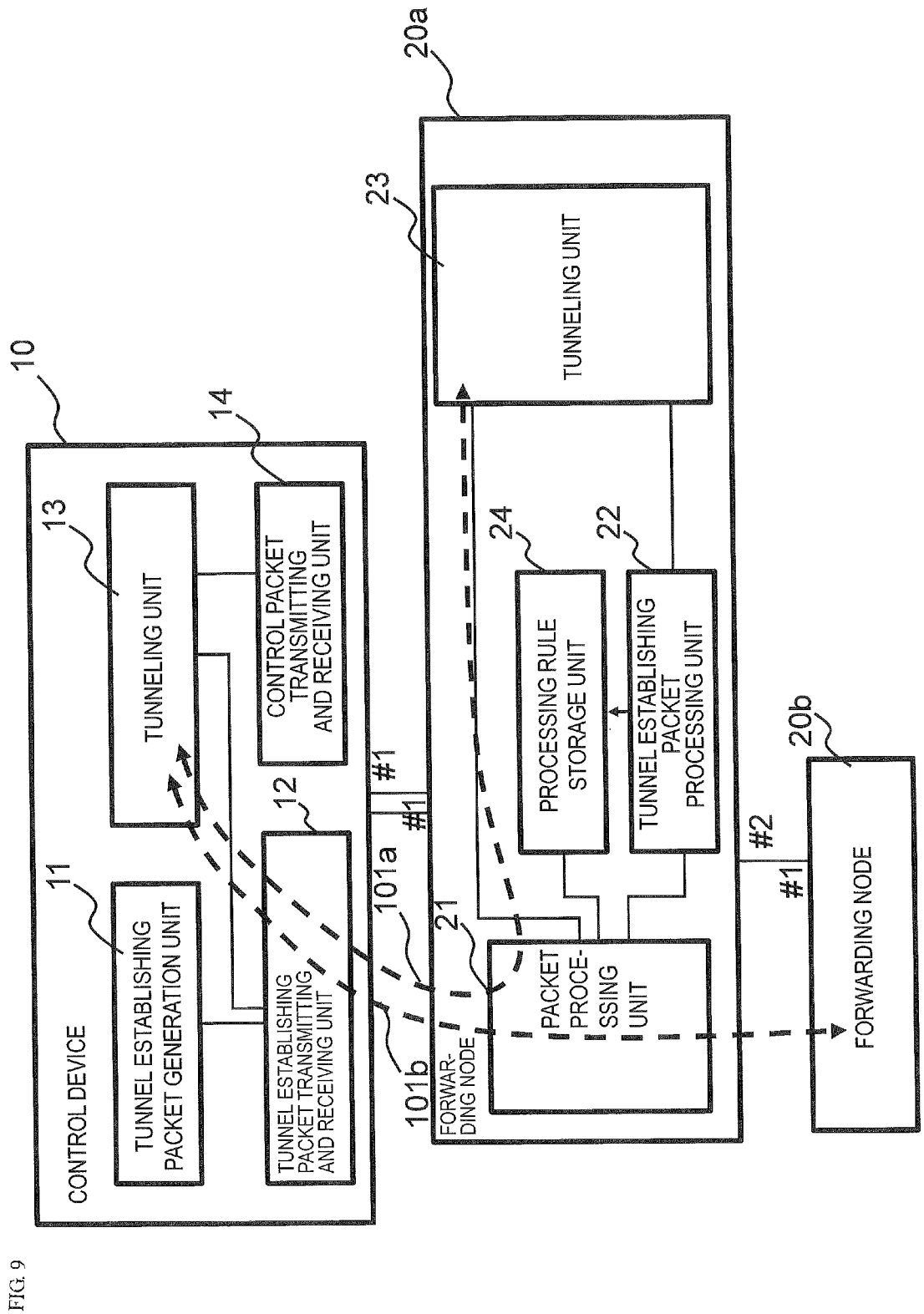
FIG. 9 is a reference diagram for describing flow of control information in the first exemplary embodiment of the invention.

FIG. 9 is a diagram showing flow of control information given or received by a control packet at the time of step S006. It is to be noted that internal blocks of the forwarding node 20b are the same as the forwarding node 20a and are omitted in FIG. 9.

The tunneling part 13 of the control device 10 forms a communication tunnel 101a using the control packet, with the tunneling unit 23 of the forwarding node 20a. An in-band secure channel for the control device 10 to control the forwarding node 20a is established in the communication tunnel 101a, as shown by a broken line.

A communication tunnel 101a is configured via the tunneling unit 13 and the control packet transmitting and receiving unit 14 of the control device 10, a communication line between the control device 10 and the forwarding node 20a, and the packet processing unit 21 and the tunneling unit 23 of the forwarding node 20a.

In the same way, the tunneling part 13 of the control device 10 forms a communication tunnel 101b using the control packet, with the tunneling unit 23 of the forwarding node 20b. An in-band secure channel for the control device 10 to control the forwarding node 20b is established in the communication tunnel 101b, as shown by a broken line.

The communication tunnel 100b is configured via the tunneling unit 13 and the control packet transmitting and receiving unit 14 of the control device 10, a communication line between the control device 10 and the forwarding node 20a, the packet processing unit 21 of the forwarding node 20a, a communication line between the forwarding node 20a and the forwarding node 20b, the packet processing unit 21 of the forwarding node 20b, and the tunneling unit 23 of the forwarding node 20b.

According to the present exemplary embodiment operating as above, each of the forwarding nodes can perform forwarding of a control packet for another forwarding node, by processing of the packet processing unit 21, without performing forwarding via the tunnel establishing packet processing unit 22. In this way, the forwarding load on each of the forwarding nodes can be reduced and it is possible to realize high speed forwarding. It is to be noted that in the example of FIG. 3, since the forwarding node performing forwarding of the control packet for another forwarding node is only the forwarding node 20a, only the forwarding load of the forwarding node 20a is reduced, but since the forwarding nodes performing forwarding of control packets for other forwarding nodes increase as the number of forwarding nodes increases, an effect of the present invention is becomes larger.

(Second Exemplary Embodiment)

Next, a detailed description is given concerning a second exemplary embodiment of the present invention, in which a modification is added to the configuration of forwarding nodes 20a and 20b, with reference to the drawings. Below, descriptions of portions common to the first exemplary embodiment are omitted, and a description centered on points of difference is given.

Figure 10:
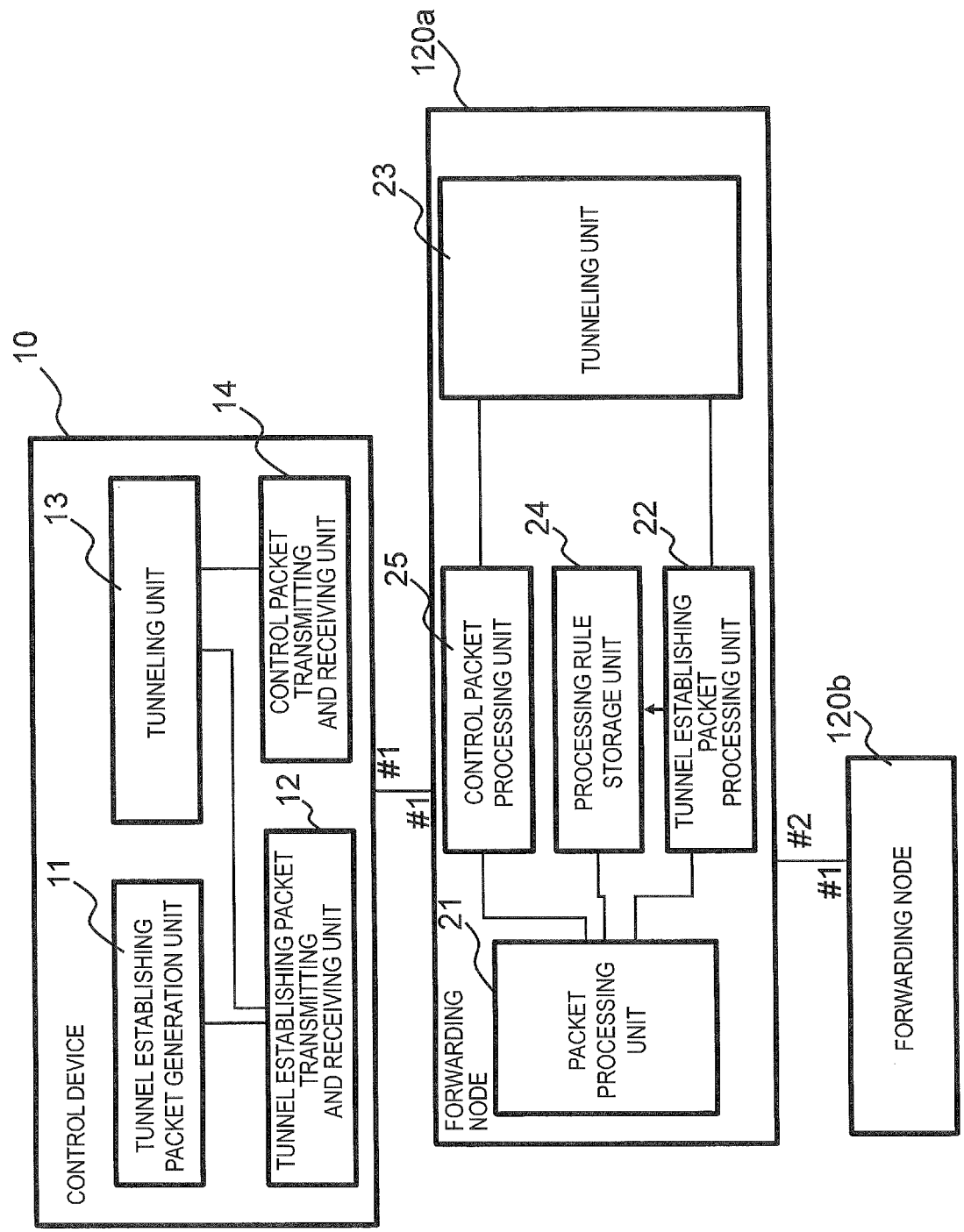
FIG. 10 is a diagram showing a configuration of a communication system according to a second exemplary embodiment of the invention.

FIG. 10 is a diagram showing a configuration of a communication system according to the second exemplary embodiment of the invention. Referring to FIG. 10, a control packet processing unit 25 is newly added between a packet processing unit 21 of a forwarding node 120a and a forwarding node side tunneling unit 23, as an addition to the first exemplary embodiment of the present invention. It is to be noted that internal blocks of the forwarding node 120b are the same as the forwarding node 20a and are omitted in FIG. 10.

The packet processing unit 21 outputs a control packet with a destination of its own forwarding node, as it is, without processing, to the control packet processing unit 25, in accordance with a processing rule set in a processing rule storage unit 24, and transmits a control packet inputted from the control packet processing unit 25, as it is, without processing, from a port specified in accordance with a processing rule.

In the first exemplary embodiment described above, the tunneling unit 23 transmits and receives a control packet from the packet processing unit 21, but in the second exemplary embodiment of the present invention the tunneling unit 23 transmits and receives a control packet via the control packet processing unit 25.

The control packet processing unit 25 converts a control packet inputted from the packet processing unit 21 to a prescribed control message that is then outputted to the tunneling unit 23. Furthermore, the control packet processing unit 25 converts a control message inputted from the tunneling unit 23 into a control packet that is then outputted to the packet processing unit 21.

As described above, in the present exemplary embodiment, since the control packet processing unit 25 is provided in the forwarding nodes 120a and 120b, even in a case where the tunneling unit 23 of the forwarding nodes 120a and 120b requests conversion into a control message different from the control packet, it is possible to omit setting a processing rule realizing the conversion processing in question.

Accordingly, in the present exemplary embodiment a processing rule by which a control packet with the forwarding node 120a as a destination, inputted at port 1, is outputted to the control packet processing unit 25, a processing rule by which a control packet inputted at the control packet processing unit 25 is outputted from port 1, a processing rule by which a control packet with the forwarding node 20b as a destination, inputted at port 1, is outputted from port #2, and a processing rule by which a control packet with the control device 10 as a destination, inputted at port #2, is outputted from port 1, are set in the forwarding node 120a.

In the same way, a processing rule by which a control packet with the forwarding node 120b as a destination, inputted at port 1, is outputted to the control packet processing unit 25, and a processing rule by which a control packet with the control device 10 as a destination, inputted from the control packet processing unit 25, is outputted from port 1, are set in the forwarding node 120b. In comparison to a processing rule group shown in FIG. 8, conversion processing between a control packet and a control message is omitted from processing rules set in the respective forwarding nodes 20a and 20b.

According to the present exemplary embodiment operating as above, it is possible to cause the control packet processing unit 25 to convert between a control packet and a control message that cannot be represented as a processing rule in the packet processing unit 21, and application of a control packet format of wider scope is possible.

Figure 11:
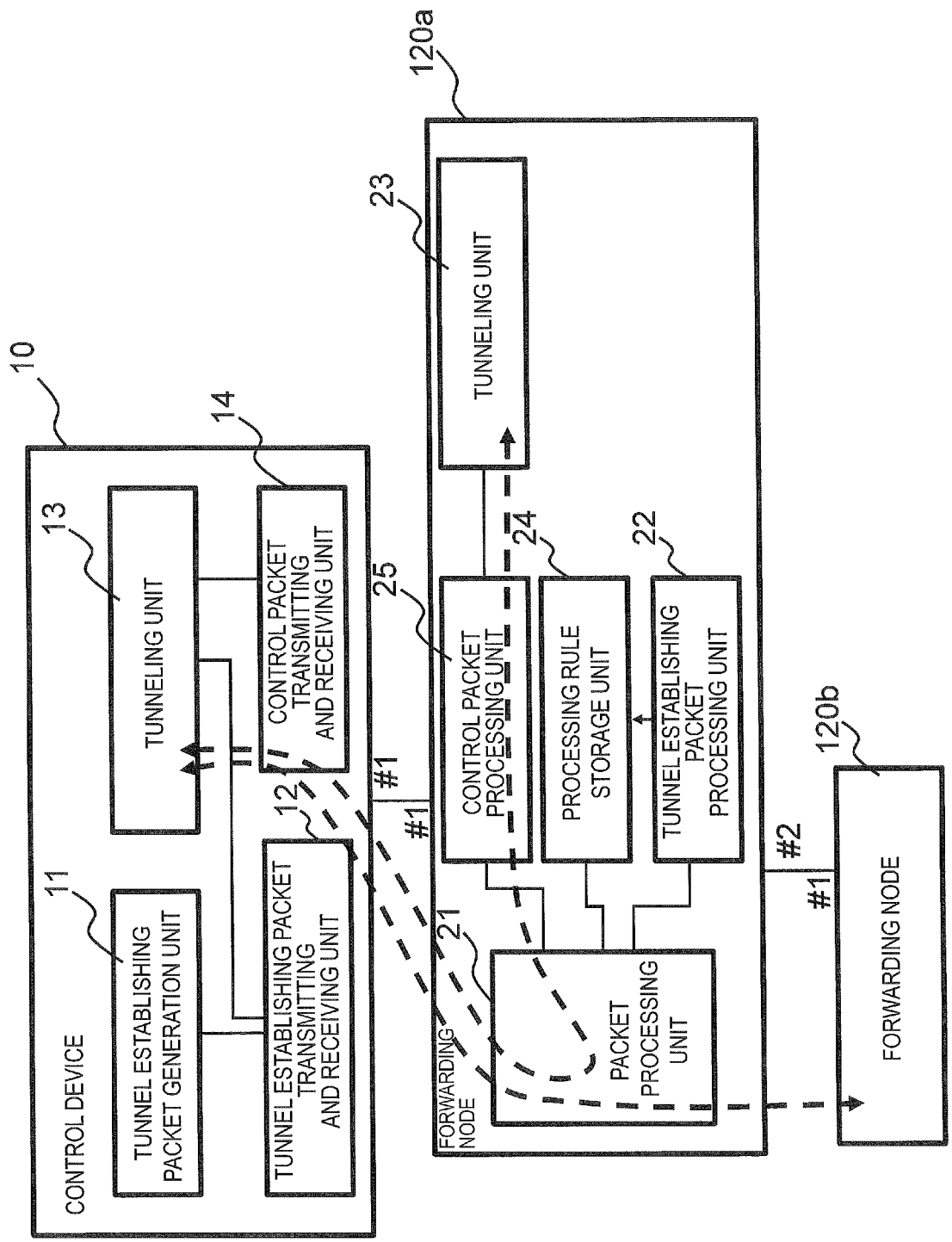
FIG. 11 is a reference diagram for describing flow of control information of the second exemplary embodiment of the invention.
Figure 12:
FIG. 12 is a diagram representing a configuration of a flow entry described in NPL 2.

In addition, according to the present exemplary embodiment, it is possible to distinguish between a tunnel establishing packet and a control packet by information outside of a destination MAC address. As a result, as shown in FIG. 11, a tunnel control packet having a destination of another forwarding node 120b can be forwarded to the other forwarding node 120b as it is. In this way, in comparison to the first exemplary embodiment, the forwarding load on respective forwarding nodes 120a can be reduced and it is possible to realize high speed forwarding.

Descriptions have been given above of respective exemplary embodiments of the present invention, but the present invention is not limited to the abovementioned exemplary embodiments, and further modifications, substitutions, and adjustments may be added within a scope that does not depart from a fundamental technical concept of the present invention. For example, in the first and second exemplary embodiments described above a description was given where the control device 10 performs collection of information and comprehension of connection relationships concerning forwarding nodes using a tunnel establishing packet, but in a case where collection of information and comprehension of connection relationships concerning forwarding nodes is done in advance, the information thereof may be used, or the information thereof may be collected using another protocol.

Each disclosure of the abovementioned PTLs and NPLs is incorporated herein by reference thereto. Modifications and adjustments of exemplary embodiments are possible within the bounds of the entire disclosure (including the scope of the claims) of the present invention, based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

REFERENCE SIGNS LISTS 10, 10A control device
11 tunnel establishing packet generation unit
12 tunnel establishing packet transmitting and receiving unit
13 tunneling unit
14 control packet transmitting and receiving unit
15 tunnel establishing unit
16 forwarding node control unit
20a to 20d, 20A to 20D, 120a, 120b forwarding nodes
21 packet processing unit
22 tunnel establishing packet processing unit
23 tunneling unit
24 processing rule storage unit
25 control packet processing unit
26 message processing unit
27 packet processing unit
100a to 100d, 101a, 101b communication tunnels

What is claimed is:

1. A communication system, comprising:
a plurality of forwarding nodes that process a received packet in accordance with a packet handling operation, the packet handling operation determining a matching rule matching a packet and a process to be applied to a packet conforming with said matching rule; and
a control apparatus that controls said forwarding nodes using control information,
wherein said control apparatus comprises a tunnel establishing unit that determines a forwarding path(s) of respective information of said control information concerning each of said forwarding nodes, the tunnel establishing unit transmitting to said forwarding nodes a tunnel establishing message including a processing rule for forwarding said control information to be set in forwarding nodes in respective paths of said forwarding path(s), and
wherein respective nodes of said forwarding nodes transmit and receive control information about said control apparatus using processing rules for forwarding said control information included in said tunnel establishing message.

2. The communication system according to claim 1, wherein said tunnel establishing message is source-routed using path information included in said tunnel establishing message.

3. The communication system according to claim 2, wherein said path information comprises an output port series listing and a hop count.

4. The communication system according to claim 1, wherein said tunnel establishing message includes information specifying a forwarding node in which a processing rule included in said tunnel establishing message is to be set, among forwarding nodes in said forwarding path(s) of said control information.

5. The communication system according to claim 4, wherein said tunnel establishing message is configured to store a processing rule for forwarding a plurality of control information items.

6. The communication system according to claim 1, wherein the tunnel establishing unit of said control apparatus comprises:
a tunnel establishing packet generation unit that collects information for establishing a tunnel with said forwarding nodes, using source-routing; and
a tunneling unit that sets a processing rule for forwarding said control information to a forwarding node(s), based on information generated by said tunnel establishing packet generation unit, the tunneling unit transmitting control information to said forwarding node(s) using said processing rule, and
wherein each of said forwarding nodes comprises:
a tunnel establishing packet processing unit that responds to said tunnel establishing packet generation unit, or forwards a tunnel establishing packet to another forwarding node; and
a forwarding node side tunneling unit that transmits and receives control information with regard to said tunneling unit of said control apparatus.

7. The communication system according to claim 1, wherein said forwarding nodes further comprise a control packet processing unit that converts control information received from said tunneling unit of said control apparatus into a prescribed format.

8. The communication system according to claim 1, wherein path information, included in said tunnel establishing message, includes an output port series listing and a hop count.

9. A control apparatus configured to be connected to a plurality of forwarding nodes that process a received packet in accordance with a processing rule, the processing rule determining a matching rule matching a packet and a process to be applied to a packet conforming with said matching rule, said control apparatus comprising:
- a tunnel establishing unit that determines a forwarding path(s) of respective control information concerning each of said forwarding nodes, the tunnel establishing unit transmitting to said forwarding node(s) a tunnel establishing message including a processing rule for forwarding said control information to be set in forwarding node(s) in each of said forwarding path(s).

10. The control apparatus according to claim 9, wherein said tunnel establishing message is source-routed using path information included in said tunnel establishing message, in said forwarding nodes.

11. The control apparatus according to claim 10, further comprising an output port series listing and a hop count, as said path information.

12. The control apparatus according to claim 9, wherein, as said tunnel establishing message, a tunnel establishing message is generated, comprising information specifying a forwarding node in which a processing rule included in said tunnel establishing message is to be set, among forwarding nodes in said forwarding path(s) of said control information.

13. The control apparatus according to claim 12, wherein, as said tunnel establishing message, a tunnel establishing message is generated, storing a processing rule for forwarding a plurality of control information items.

14. The control apparatus according to claim 9, further comprising:
- a tunnel establishing packet generation unit that collects information for establishing a tunnel with said forwarding nodes, using source-routing; and
- a tunneling unit that sets a processing rule for forwarding said control information to a forwarding node(s), based on information generated by said tunnel establishing packet generation unit, and also transmits control information to said forwarding node(s) using said processing rule.

15. A forwarding node, comprising:
- a tunnel establishing packet processing unit that responds to said tunnel establishing packet generation unit of said control apparatus according to claim 14, or forwards a tunnel establishing packet to another forwarding node; and
- a forwarding node side tunneling unit that transmits and receives control information with regard to said tunneling unit of said control apparatus.

16. The forwarding node according to claim 15, further comprising a control packet processing unit that converts control information received from said tunneling unit of said control apparatus into a prescribed format.

17. The control apparatus according to claim 9, wherein said tunnel establishing message includes information specifying a forwarding node in which a processing rule included in said tunnel establishing message is to be set.

18. A control method for a communication system comprising a plurality of forwarding nodes that process a received packet in accordance with a processing rule, the processing rule determining a matching rule matching a packet and a process to be applied to a packet conforming with said matching rule, and a control apparatus that controls said forwarding nodes using control information, said method comprising:
- determining, by said control apparatus, a forwarding path(s) of respective information of said control information concerning each of said forwarding nodes, and transmitting to said forwarding node(s) a tunnel establishing message including a processing rule for forwarding said control information to be set in forwarding node(s) in respective paths of said forwarding path(s); and
- transmitting and receiving control information, by respective nodes of said forwarding nodes, about said control apparatus using processing rules for forwarding said control information included in said tunnel establishing message.

19. The control method according to claim 18, wherein path information, included in said tunnel establishing message, includes an output port series listing and a hop count.

20. The control method according to claim 18, wherein said tunnel establishing message includes information specifying a. forwarding node in which a processing rule included in said tunnel establishing message is to be set.

* * * * *